United States Patent [19]

Hofmann et al.

[11] Patent Number: 4,812,143
[45] Date of Patent: Mar. 14, 1989

[54] LIQUID FORMULATIONS OF DISPERSE DYESTUFFS CONTAINING INORGANIC OXIDES OR SILICATES FOR DYEING TEXTILE MATERIALS

[75] Inventors: Klaus Hofmann, Frankfurt am Main; Ulrich Bühler, Alzenau; Erwin Dietz, Kelkheim, all of Fed. Rep. of Germany

[73] Assignee: Cassella Aktiengesellschaft, Frankfurt am Main, Fed. Rep. of Germany

[21] Appl. No.: 129,248

[22] Filed: Dec. 7, 1987

[30] Foreign Application Priority Data

Dec. 22, 1986 [DE] Fed. Rep. of Germany ....... 3643864

[51] Int. Cl.$^4$ .......................... C09B 67/40; D06P 1/67
[52] U.S. Cl. ........................................... 8/528; 8/527; 8/618; 8/625; 8/626; 8/632; 8/532; 8/533
[58] Field of Search .................... 8/527, 625, 626, 632

[56] References Cited

U.S. PATENT DOCUMENTS 3,707,347 12/1972 Mueller ..................................... 8/446
3,994,683 11/1976 Zimmer et al. ......................... 8/444
4,105,572 8/1978 Gorondy ............................. 252/8.6

FOREIGN PATENT DOCUMENTS 56-112583 9/1981 Japan .
59-226060 12/1984 Japan .

*Primary Examiner*—A. Lionel Clingman
*Attorney, Agent, or Firm*—Connolly and Hutz

[57] ABSTRACT

Liquid formulations of disperse dyestuffs for dyeing hydrophobic synthetic fiber materials or mixtures of synthetic fiber materials with cellulose fiber material or wool contain from 0.1 to 10% by weight of pulverulent highly disperse inorganic oxides or silicates or mixtures of both said oxides and silicates having a specific surface area (BET) of 20 to 800 m$^2$/g.

7 Claims, No Drawings

LIQUID FORMULATIONS OF DISPERSE DYESTUFFS CONTAINING INORGANIC OXIDES OR SILICATES FOR DYEING TEXTILE MATERIALS

Liquid formulations of disperse dyestuffs, i.e. dyestuffs which are free of water-solubilizing groups and used for dyeing hydrophobic synthetic fibres, for example polyester, are known and commercially available.

Such liquid dyestuff formulations are prepared by mixing the disperse dye with dispersants and further additives, for example antifreezes, humectants, antifoams, antimicrobica, fungicides and the like, and mechanically reducing the mixture to a certain fineness, for example by milling. The fineness is generally sufficient when 90% of the dyestuff particles of the disperse dyestuff have a particle size of less than 5 $\mu$m, preferably when 50% or more of the dyestuff particles have a particle size of less than 1 $\mu$m. In the course of this treatment, which is also referred to as finishing, the disperse dyestuff becomes converted into its ready-to-use form which guarantees a high dyestuff yield and a level dyeing when the dispersion of the disperse dye in the liquor and the stability of the dispersion are satisfactory.

However, for use in practice a liquid formulation of a disperse dye must in addition meet other quality criteria, for example in respect of rheological properties, viscosity, redispersability, compatibility with other dyestuffs, salt or auxiliary sensitivity and the like.

For instance, the viscosity of the liquid formulation must be within certain limits, i.e. the liquid dyestuff formulation must be pourable or stir pumpable in pipes and be readily stirrable in the preparation of dyestuff mixtures. An important requirement in connection with viscosity is that the liquid dyestuff formulation must retain its state of fine division even in the course of prolonged storage and/or in the course of storage at elevated temperatures, i.e. must not give rise to settling or sedimenting. Settling refers to the phenomenon where, in the course of time, the dyestuff concentration increases in the bottom part of the container and decreases in the upper part of the container, thereby rendering any defined dyestuff removal impossible. Effectively, it is even possible that there is then no dyestuff at all to be found any longer in the upper part of the container. Moreover, it is possible in this connection that the dyestuff accumulates at the bottom of the container in a form where it is difficult or even impossible to be resuspended, which is referred to as "cementeous" settling. Such settling forces the user to stir this liquid dyestuff formulation continuously or at intervals by immersing the stirrer, or th use a tumbler in which the entire package is agitated, which requires an additional expense for the acquisition of appliances or the constant cleaning of these appliances. Low viscosity liquid dyestuff formulations which are easier to handle generally exhibit a more rapid, undesirable settling than those of higher viscosity.

Now, in the case of liquid formulations of disperse dyestuffs having a low dyestuff content it is possible, within certain limits, by suitably choosing or combining the dispersants or by suitably choosing the quantities or mixing ratios of these dispersants, to prepare formulations of the desired low viscosity which at the same time exhibit no settling, or a still acceptably low degree of settling.

For reasons of economy, however, it is desirable to prepare liquid formulations having a very high dyestuff content of up to 50%, which naturally requires the dispersant and auxiliary content to be reduced to values down to 20% and for such formulations to have a minimum water content of 20%. The leeway in obtaining the desired viscosity and at the same time the desired settling behaviour is thus very limited in the case of highly concentrated liquid formulations, and this object has hitherto usually proved elusive in practice.

It has now been found, surprisingly, that the settling behaviour of disperse dye liquid formulations can be optimized by adding pulverulent highly disperse inorganic oxides or silicates or mixtures of these substances with one another which have a specific surface area by gas adsorption using the method of Brunauer, Emmett and Teller, abbreviated as specific surface area (BET), between 20 and 800 m$^2$/g.

The determination of specific surface area of solids by gas adsorption using the method of Brunauer, Emmett and Teller (BET), cf Brunauer S., Emmett P.H. and Teller E.: Adsorption of Gases in Multimolecular Layers', Journal of the American Chemical Society, 60 (1938), 309–319, is described, e.g., in the German DIN standards 66,131 and in Gregg S.J. and Sing K.S.W.: "Adsorption, Surface Area and Porosity", Academic Press, London/New York (1967), Chapter 2, in particular pp 35 to 65.

For the inorganic products to be used according to the invention the specific surface area (BET) is 20 to 800 m$^2$/g, preferably 25 to 600 m$^2$/g.

Suitable inorganic oxides or silicates are for example silicon dioxide, silica, aluminium oxide and titanium dioxide and also naturally occuring layer silicates, for example bentonites and the like.

Preference is given to highly disperse silicon dioxides and to mixtures of highly disperse silicon dioxides with highly disperse aluminum oxides.

Particular preference is given to aluminium hydro layer silicates which occur in nature under the designation bentonite, the activated forms of these bentonites being particularly preferred in turn.

These inorganic substances are commercially available and are described for example in Ullmann's Enzyklopädie der Technischen Chemie [Encyclopedia of Chemical Technology], volume 23, page 311 et seq., (1983, IVth edition); volume 18, page 651 et seq.; volume 21, page 462 et seq.

The highly disperse pulverulent inorganic oxides and silicates can be added to the dyestuff formulations not only directly in pulverulent form, but preferably in the form of a slurry, in particular in water. If a slurry is used, sufficient time should be allowed before addition to the dyestuff mixture for complete swelling of the inorganic product.

The amounts in which these inorganic substances are added, based on the liquid formulations, are within the range from 0.1 to 10% by weight. Preference is given to an amount of 0.2 to 5% by weight. The addition can take place before the milling of the disperse dye or after the milling. The inorganic substance to be used according to the invention is preferably allowed to swell for some time after the addition (1 to 24 hours), and the dispersion thus obtained is then subjected to shearing forces. If the addition takes place before the milling, shearing forces are applied through the grinding medium, while if the addition takes place during the milling or after the milling the shearing forces are, for example, applied by means of a stirrer.

The dispersants used for producing such preparations are anionic or nonionic, surface-active compounds which can also be used together. If such dyestuff preparations are given an anionic finish, the anionic dispersants which are otherwise customary in the conventional dyeing with disperse dyestuffs from an aqueous medium are suitable. Particularly suitable in this respect are the alkali metal or ammonium salts of the ligninsulphonic acids which are produced by the sulphite or kraft process; condensation products of aromatic sulphonic acids and formaldehydes, in particular condensation products of optionally substituted phenol with formaldehyde and sodium bisulphite, alkali metal salts of condensation products of optionally substituted phenol, naphthalenesulphonic and naphtholsulphonic acids with formaldehyde and sodium bisulphite; alkali metal salts of condensation products of optionally substituted phenolsulphonic acids, formaldehyde and urea; long-chain alkyl- or aryl sulphonates, and alkyl aryl polyglycol ether sulphates.

Preferred nonionic dispersants or emulsifiers for the liquid formulations of insoluble dyestuffs are for example reaction products of alkylene oxides, for example ethylene oxide or propylene oxide, with alkylatable compounds, for example fatty alcoholates, fatty amines, fatty acids, optionally polynuclearphenols, alkylphenols, arylalkylphenols and their acid esters, and also carboxamides, in particular addition products of 5 to 10 ethylene oxide units on $C_8$–$C_{10}$-alkylphenols and also esterified oxyalkalates as known from European Patent Specifications EP-B1-0,028,342 and EP-B1-0,041,688.

The humectants and antifreezes used in the dyestuff formulations are preferably di- or polyalcohols, such as ethylene glycol, propylene glycol, glycol or sorbitol.

The preparation of the abovementioned formulations can be effected by the known methods. The disperse dyestuff or, in the case of mixtures, the disperse dyestuffs are slurried together with suitable dispersants or dispersant mixtures (it being expedient to use anionic and nonionic dispersants or dispersant mixtures together in a ratio of 9:1 to 1:9) and the further additives in water, and the mixture is subjected to mechanical comminution. This mechanical comminution is preferably effected in kneaders, ball mills, dispersers, bead mills, sand mills or attritors.

The obtaining of an adequate state of fine division of the disperse dyestuff of in general 90% of dyestuff particles corresponding to a particle size of less than 5 $\mu$m, preferably 50% or more of the particles being less than 1$\mu$m, can be verified by means of a filter test, a microscope or sedimentation analysis.

The formulations thus obtained contain a dyestuff in a stable, finely divided form and have a high dyestuff concentration while being low in dispersant and pourable. Such liquid disperse dyestuff formulations are used for dyeing and printing polyester fibres and the polyester fibre portion of corresponding mixtures with other fibres. A preferred use in this context is the continuous dyeing of such textiles by the thermosol process, wherein the dyestuff dispersed in a water-containing padding liquor is padded onto the textile fabric web and, after intermediate drying, is fixed on the fibre by reheating for a short time.

The subject-matter of the invention is illustrated by the examples which follow.

EXAMPLE 1

672 parts of an aqueous paste of Disperse Yellow C.I. 114, corresponding to 380 g of pure dyestuff, 200 parts of monoethylglycol, 71 parts of a commercially available dispersant based on 4-benzyl-2-hydroxydiphenyl and ethylene oxide, 1 part of o-phenylphenol and 36 parts of water are suspended in a vessel using a dissolver disc and stirred at 120° C. in an autoclave for 2 h. 20 parts of an activated aluminium hydro layer silicate (commercially available bentonite) having a specific surface area (BET) of on average 30 to 40 m$^2$/g are then added. After a swelling time of 6 h the mixture is bead-milled with Ottawa sand having an average particle size of 0.7 to 1 mm. A milling time of 3 h produces a dispersion where 80% of the dyestuff particles have a particle size of less than 1 $\mu$m. Removal of the milling sand and subsequent sieving through a 90 DIN sieve produces a highly fluent dough having a dyestuff content of 38%. This dyestuff formulation is storable at room temperature and at 50° C. for several months without exhibiting separation.

EXAMPLE 2

Example 1 is repeated, except that 54 parts of water and, after the heating to 120° C., 2 parts of the modified activated aluminium hydro layer silicate are added. The dyestuff dough is storable at room temperature and at 50° C. for several months without exhibiting separation.

EXAMPLE 3

651.0 parts of an aqueous paste of the dyestuff C.I. Orange 151, corresponding to 221.5 g of pure dyestuff, 150 parts of a purified ligninsulphonate, 50 parts of monoethylene glycol, 3 parts of o-phenylphenol and 15 parts of an activated aluminium hydro layer silicate (commercially available bentonite having a specific surface area (BET of 30 to 40 m$^2$/g) and 131 parts of water are breadmilled using Ottawa sand having an average particle size of 0.7 to 1.0 mm. A milling time of 1½ h produces a dispersion where 80% of the dyestuff particles have a particle size of less than 1 $\mu$m. Removal of the milling sand and subsequent sieving through a 120 DIN sieve produces a highly fluent dyestuff dough having a dyestuff content of 22.1%. This dyestuff dough is storable at room temperature and at 50° C. for several months without dyestuff sedimentation or phase separation.

EXAMPLE 4

479.3 parts of an aqueous paste of the dyestuff C.I. Disperse Blue 165, corresponding to 441 parts of pure dyestuff, 221 parts of monoethylene glycol, 44 parts of a commercially available dispersant based on a reaction product, esterified with acetic acid, of nonylphenol with ethylene oxide, 22 parts of condensation product of cresol, sodium salt of 2-hydroxynaphthalene-6-sulphonic acid, formaldehyde and sodium sulphite, 1 part of sodium nonylphenolate, 3 parts of o-phenylphenol, 20 parts of an activated aluminium hydro layer silicate having a specific surface area (BET) of 30 to 50 m$^2$/g and 209.7 parts of water are blended with a dissolver and sand-milled for 3 h as in Example 1. A milling time of 3 h at 25° C. produces a dispersion where 70% of the dyestuff particles have a particle size of <1 $\mu$m. Removal of the milling sand and sieving through a 120 DIN sieve produces a fluent dyestuff dough which contains 44.1 parts of dyestuff. On storage for several months at room temperature and 50° C. this dough exhibits no dyestuff sedimentation or phase separation.

EXAMPLE 5

672 parts of an aqueous paste of Disperse Yellow C.I. 114, corresponding to 380 parts of pure dyestuff, 200 parts of monoethylene glycol, 71 parts of the reaction product of 4-benzyl-2-hydroxydiphenyl with 12 moles of ethylene oxide, 1 part of o-phenylphenol and 26 parts of water are blended with a dissolver disc and stirred at 120° C. in an autoclave for 2 h to form the γ-modification, which is stable to dyeing. 10 g of an activated aluminium hydro layer silicate and 16 g of a pyrogenically prepared highly disperse silicon dioxide and 4 parts of a highly disperse aluminium oxide having a specific surface area (BET) of 170 m$^2$/g are added and, after a swelling time of 3 h, milled as in Example 1. A milling time of 4 h at 25° C. produces a dispersion where 80% of the dyestuff particles are smaller than 1μm. Removal of the milling sand and sieving through a 90 DIN sieve produces a fluent dyestuff dough which contain 38% dyestuff. This dough is storable at 50° C. and room temperature for several months without sign of dyestuff sedimentation or phase separation.

EXAMPLE 6

563 parts of an aqueous paste of the dyestuff Disperse Blue C.I. 96, corresponding to 205 parts of pure dyestuff, 82 parts of a purified sodium ligninsulphonate, 100 parts of monoethylene glycol, 3 parts of o-phenylphenol and 12.5 parts of highly disperse silicon dioxide and 2.5 parts of highly disperse aluminium oxide having a specific surface area (BET) of 170±30 m$^2$/g and 237 parts of water are blended with a dissolver and sand-milled for 2 hours as described in Example 1. A milling time of two hours at 20 to 25° C. produces a dispersion where 85% of the dyestuff particles have a particle size of <1 μm. Removal of the milling sand and sieving through a 120 DIn sieve leaves a dyestuff dough which contains 20.5% of dyestuff. On storage at room temperature or 50° C. for several months this dough shows no sign of dyestuff sedimentation or phase separation.

What is claimed is:

1. In a disperse dyestuff paste having a dyestuff content of up to 50% by weight the improvement comprises said dough containing 0.1 to 10% by weight of a pulverulent highly disperse inorganic oxide or silicate or a mixture thereof which has a BET specific surface area of 20 to 800 square meters per gram.

2. Disperse dyestuff paste according to claim 1 having a dyestuff content of 20.5 to 50% by weight.

3. Disperse dyestuff paste according to claim 1 containing 0.2 to 5% by weight of the pulverulent highly disperse inorganic oxide or silicate.

4. Disperse dyestuff paste according to claim 1 wherein the disperse inorganic oxide or silicate is silicon dioxide, aluminum oxide, titanium dioxide, silicas or a naturally occurring aluminum hydro layer silicate.

5. Disperse dyestuff paste according to claim 1 wherein the pulverulent highly disperse inorganic oxide or silicate has a BET specific surface area of 25 to 600 square meters per gram.

6. Disperse dyestuff paste according to claim 1 containing highly disperse, naturally occurring activated aluminum hydro layer silicate.

7. Process for preparing an improved liquid disperse dyestuff paste which comprises adding to a liquid disperse dyestuff paste containing 20.5 to 50% by weight disperse dyestuff, 0.1 to 10% by weight of a highly disperse pulverulent inorganic oxide or silicate or a mixture thereof having a BET specific surface area of 20 to 800 square meters per gram.

* * * * *